Nov. 8, 1966  J. B. CUMMINS  3,283,685
MULTIPLE-IMAGE PORTRAIT CAMERA
Filed June 2, 1964  4 Sheets-Sheet 1

INVENTOR
James B. Cummins

BY Brown and Mikulka
ATTORNEY

Nov. 8, 1966   J. B. CUMMINS   3,283,685
MULTIPLE-IMAGE PORTRAIT CAMERA
Filed June 2, 1964   4 Sheets-Sheet 2

INVENTOR
James B. Cummins

BY Brown and Mikulka
ATTORNEY

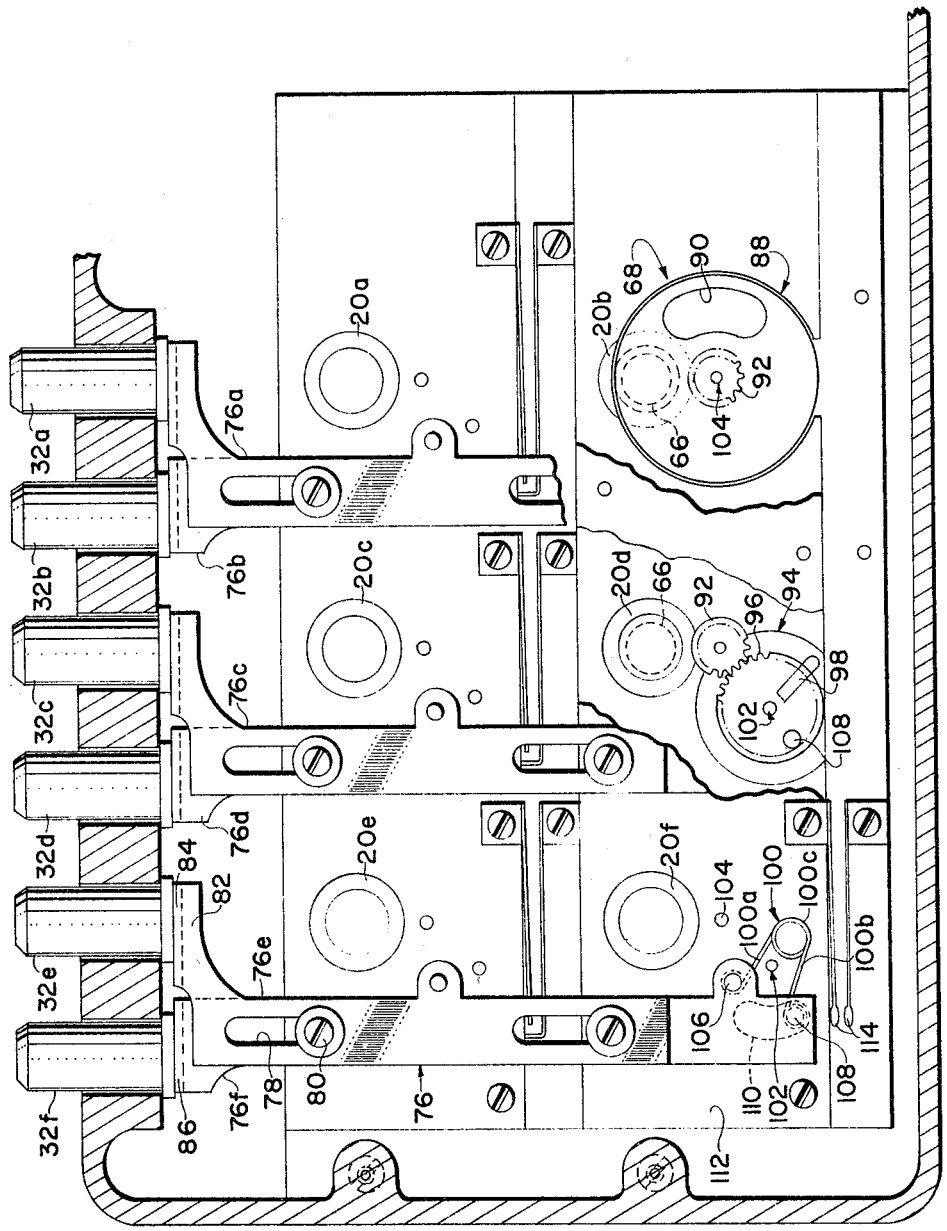

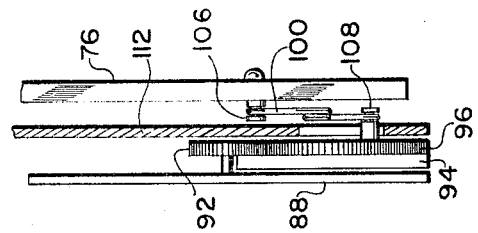
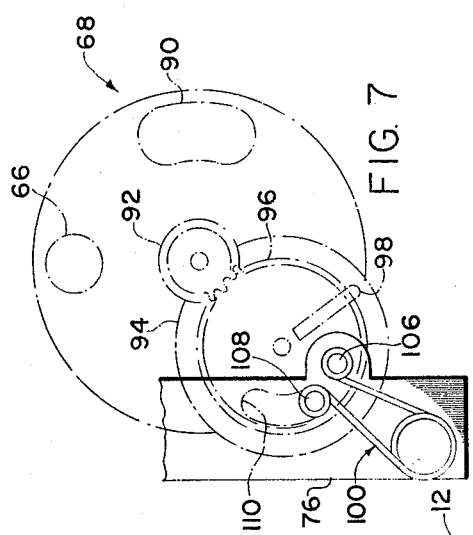
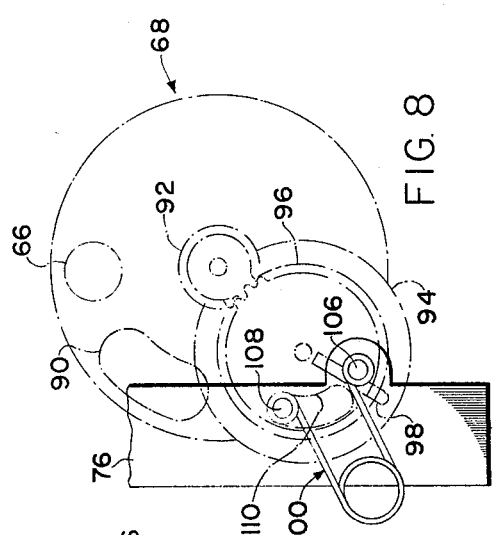
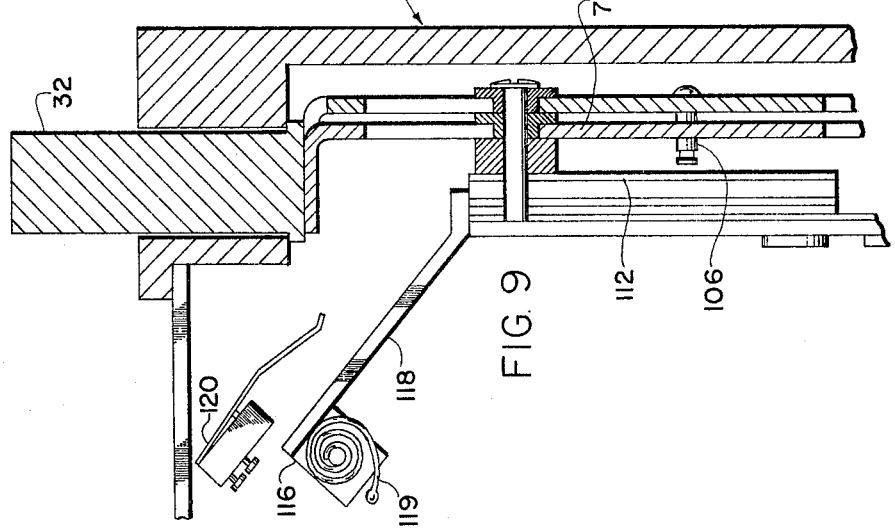

United States Patent Office 3,283,685
Patented Nov. 8, 1966

3,283,685
MULTIPLE-IMAGE PORTRAIT CAMERA
James R. Cummins, Silver Spring, Md., assignor to Polaroid Corporation, Cambridge, Mass., a corporation of Delaware
Filed June 2, 1964, Ser. No. 371,977
4 Claims. (Cl. 95—18)

This invention relates to a studio-type of camera for producing rapidly and relatively inexpensively, a plurality of images or "poses" of a human subject, without requiring any change of focus or other adjustment of the camera, and especially to such a camera which includes means for accommodating a liquid-containing film assembly of a self-processing category adapted to produce both a set of negatives and a set of positives or proofs, the latter being immediately available to the customer.

The camera of the present invention is intended to fill the need for a photographic studio or portrait camera having novel operational and performance advantages, namely, a camera which can be operated by a novice and yet which is capable of quickly and concurrently producing both a set of prints or "proofs" and a set of negatives of the photographic subject, of a predetermined invariably excellent quality and in an orderly arrangement of poses. The proofs can be given, immediately, to the person photographed, without the delay of hours or days usually incurred in making several preliminary negatives and positives in the photographic laboratory. The forwarding of proofs is also thus avoided and it is probable that the customer can make a final decision as to a choice of pose or poses for enlargement and possible retouching immediately, that is, before leaving the studio.

To facilitate the foregoing objectives, the camera incorporates, as the principal element of the camera back, means for accommodating a 4 x 5 film holder or adapter, such as the Model No. 500 Film Holder manufactured by Polaroid Corporation, Cambridge, Massachusetts, U.S.A., or the like. In turn, the film holder is adapted to employ a film assembly of a type capable of producing both a positive and negative, i.e., the so-called Type 55 Positive/Negative Film Packet, also manufactured by Polaroid Corporation, which, through a diffusion transfer procedure produces, within a few seconds, both a finished positive and a fully-developed negative, each of high quality, without the need of a darkroom. Other basic features include a plurality of lenses, e.g., six lenses, with focus and the aperture fixed relative to a subject to be posed at a given distance, and a like number of associated individually operable shutters which with interior compartmentation, permit, in rapid succession, a similar number of independent exposures on a single format such as the 4 x 5 film, above described. Each shutter has a given speed and is provided with electrical contacts for electronic flash.

In accordance with the foregoing considerations, a principal object of the invention is to provide a fixed-focus studio-type of camera requiring no adjustment and capable, immediately following a series of photographic exposures, of producing on a single format a complete set of proofs of "professional" quality, for selection by the photographic subject of a preferred pose or poses.

Other objects are to provide a camera as described which includes means for providing a predetermined exposure pattern of multiple images on a given film format and for indicating at all times the exposed and exposable areas of said format; to provide a camera of the character described having a plurality of identical fixed-focus lenses, diaphragms, fixed-speed shutters and shutter release buttons, arranged in banks; to provide such a camera which employs a conventional, commercially-available type of film-holder incorporating processing mechanism as the principal component of the camera back, the film-holder accommodating a film assembly that embodies therewithin a processing liquid; to provide a camera, as set forth, which includes a plurality of efficient and uniformly-operative shutter means; to provide a camera as described, having an easily manipulated shutter reset or cocking means for cocking one or more shutters in a single operation; to provide a camera, of the type stated, which includes a simple and effective electronic flash actuating means cooperating with each shutter and its reset mechanism; to provide a camera of the character described having a compartmented exposure chamber providing a plurality of individual segregated exposure areas within an overall area of the film format; to provide a camera which, despite possessing special features relating to its multiple exposure capabilities, is of generally uncomplicated structure and therefore of moderate cost; and to provide a camera which, although capable of high-quality picture-taking performance, lacks the usual cumbersomeness of studio apparatus and is relatively compact, lightweight and readily transportable.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 4 is a diagrammatic rear view of the camera, partly in cross-section and with parts broken away;

FIG. 6 is a fragmentary end view of the shutter mechanism;

FIGS. 7 and 8 are diagrammatic fragmentary views of the shutter mechanism at two operative positions; and FIG. 9 is a diagrammatic side elevational view, partly in cross-section, of the shutter cocking mechanism.

Figure 1:
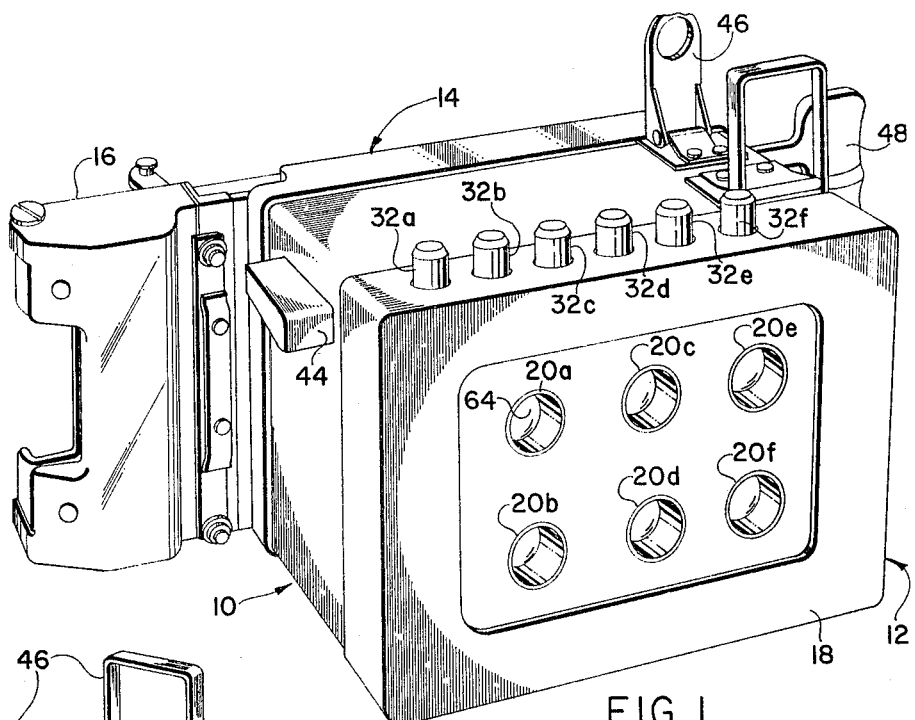
FIGURE 1 is a front perspective view of the camera of the invention.

Referring to FIGURE 1, the visible components of the generally rectangular, box-like camera 10 of the invention, include the camera front 12; the camera back 14, the latter including the film-holder or adapter 16; a removable front plate 18; the banks of lens apertures 20a, 20b, 20c, 20d, 20e and 20f; the shutter actuating or release buttons 32a, 32b, 32c, 32d, 32e and 32f, a shutter cocking or resetting lever 44, a viewfinder 46, and a carrying handle 48. The terms "front" and "back" or "rear" are used herein in their conventional sense as relating to, or proximity to lens-mounting and film-mounting areas or portions, respectively.

Figure 2:
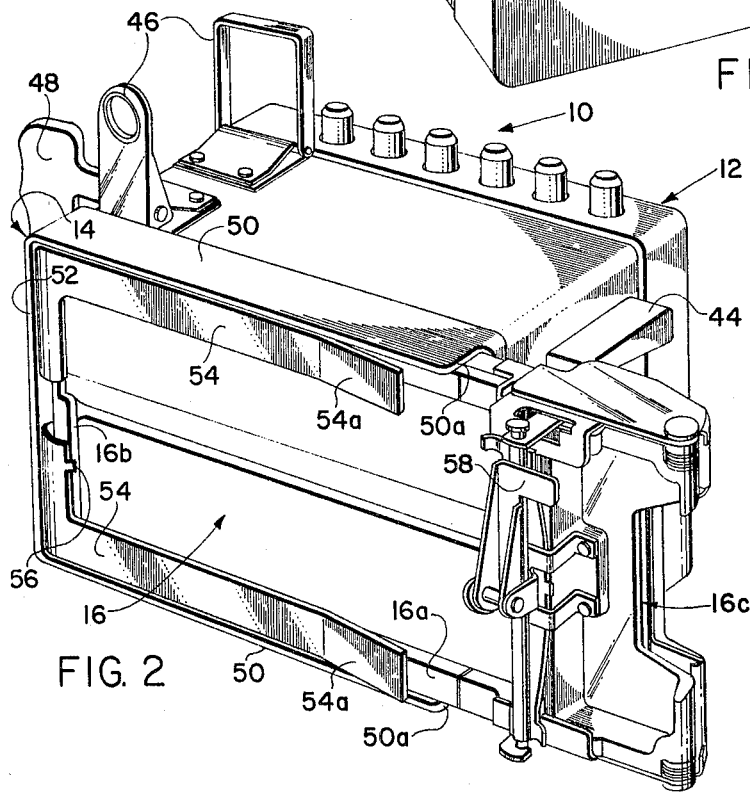
FIG. 2 is a rear perspective view of the camera, showing the film-holder.

In FIG. 2, wherein the camera 10 is illustrated from the rear, the film-holder 16 is shown as a principal component of the camera back, slidably mounted and releasably retained by other elements of the camera back. The latter include a pair of longitudinal guide members 50, having slightly laterally flared extremities 50a and adapted to bear against the longitudinal edges of the film-holder; a transverse end member 52, unitary with the guide members 50 and providing a limit stop which determines the maximum insertion of the film-holder; and a pair of resilient pressure-applying members or fingers 54 having rearwardly flared extremities 54a and adapted to bear against rear longitudinal marginal areas 16a of the film-holder. A self-releasing click-type of spring detent 56 bears against the surface 16b of the film-holder when it is completely inserted. All of the aforesaid elements cooperate to assure proper seating of the film-holder to provide correct positioning of a film assembly carried thereby relative to the focal plane and are so juxtaposed as to prevent any entrance of actinic light around their edges to the film emulsion at the front of the film-holder when it is uncovered for exposure purposes. A film assembly of a positive/negative type and including a photosensitive emulsion, a releasably-contained processing liquid, a sheet adapted to carry a positive image formed thereon by diffusion transfer, and a removable covering envelope is inserted in the film-holder at the end 16c by placing the lever 58 at the position shown in FIG. 2. This moves a pair of pressure rolls underlying the lever (not shown) apart, permitting the film assembly to be completely inserted therebetween but leaving one end protruding to serve as a leader to be manually grasped and drawn upon. The covering envelope of the film assembly is partially removed for the photographic exposure, then returned to its covering position. The lever 58 is, thereafter, rotated 180°, bringing the pressure rolls closely adjacent to one another. The entire film assembly is then manually withdrawn between the pressure rolls by means of the leader to effect processing. A more comprehensive description of the film-holder and of the film assembly employed therewith is contained in U.S. Patent No. 2,933,993.

Figure 3:
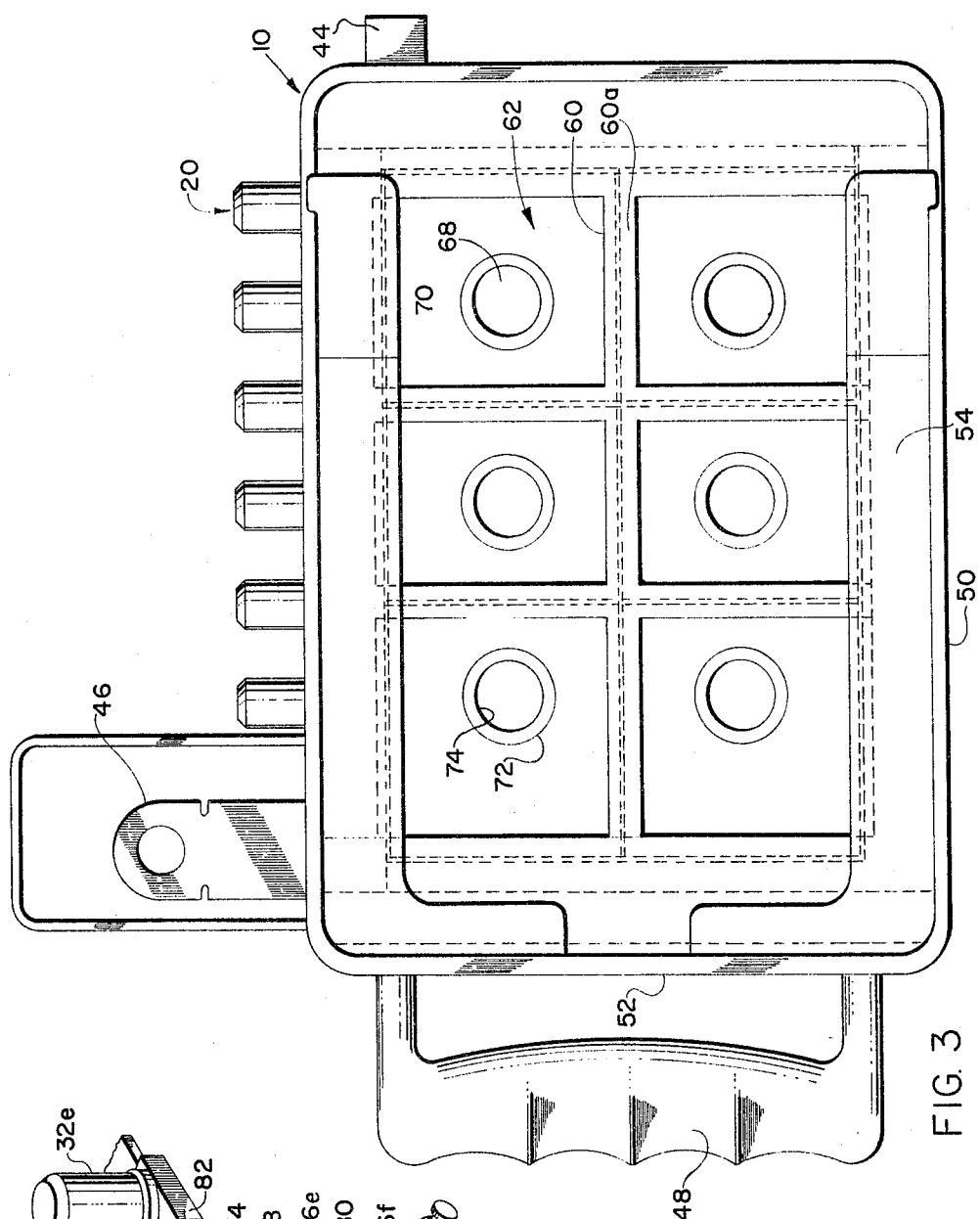
FIG. 3 is a diagrammatic rear elevation of the camera, with the film-holder removed to illustrate the interior compartmentation.

The rear of the camera, with the film-holder removed to reveal the front-to-rear compartment and open-ended wall structure 60, in an "egg-crate" conformation and providing a plurality of exposure chambers or compartments 62 is shown in FIG. 3. Each compartment is associated with a given individual exposure means comprising a lens 64, a diaphragm 66 and a shutter 68 and defines an exposure area of the photosensitive emulsion. The compartment walls extend forwardly to a transverse wall or web 70 in which are formed aperture 72 mounting, in turn, tubular light-transmitting passage means 74 which lead further forwardly to the aforesaid shutter, diaphragm and lens elements. The walls are relatively spaced to provide a substantially central location of the photographic subject in each picture area and to compensate for any problem in this regard which might be due to parallax. The compartment walls extend rearwardly so that their rear surfaces 60a lie in a plane adjacent to but slightly spaced from that of the photosensitive surface or emulsion of the film assembly when it is positioned at the focal plane, for photographic exposure. This is permitted by reason of the fact that the light rays from the lens are at a narrow angle and cannot pass from one compartment to another. Wherein the compartment structure overlies the photosensitive emulsion, the latter remains unexposed and a frame or border is thus provided for each image area. If desired, a separate decorative mask can be overlaid on the finished print to provide a more attractive final product, the frame portions of this mask generally corresponding to the aforesaid frame or border produced by the photographic exposure.

Optical elements incorporated with the camera are as follows, although it should be understood that the stated type or characteristics thereof are not to be considered as inflexible. As previously described, the camera includes six lenses, associated with the apertures 20a through 20f of FIGURE 1, with focus, and associated shutter speed and aperture fixed. The shutter is of a behind-the-lens type and its speed may, appropriately, be at a selected value between $1/75$ to $1/150$ second, e.g., at the latter value. Triplet meniscus achromat lenses, having a given focal length between approximately 93 mm. and 98 mm. with a fixed relative aperture of $f/16$, are employed. Focus is fixed at an approximately 66 inch object distance. Depth of field is from 4½ ft. to 7 ft. The viewfinder 46, illustrated, is of a simple open type.

In FIGS. 4 through 8, the shutter and its actuating mechanism are shown in detail. FIG. 4 illustrates the shutter components and actuating means therefor of the camera front, at the cocked position, in anticipation of making a photographic exposure. Each of the shutter actuating buttons, 32a through 32f, is attached to a slidably-mounted, vertically-movable bar or link 76, the extent and direction of movement of which is controlled by the slot 78 formed in the bar and the pin 80, fixedly mounted on a plate of the camera front, the slot and pin providing a limit stop means relative to slidable movement of the bar. Pairs of bars 76a and 76b, 76c and 76d, and 76e and 76f are superimposed in slightly-spaced relation for independent movement and are associated, respectively, with linearly disposed pairs of actuating buttons 32a and 32b, 32c and 32d, and 32e and 32f. To enable this superimposed mounting of the bars 76, in conjunction with an in-line mounting of the buttons 32 in the long direction of the camera and at 90° to the fore-and-aft arrangement of each pair of bars, the bars 76a, 76c and 76e of each pair include the integral coplanar, sideways angularly-extending portions 82 and the integral portions or overturned extremities 84 extending at 90° from the portions 82. The portions 84 constitute platforms or overturned portions at the extremities of the bars upon which the buttons 32a, 32c and 32e are mounted. The bars 76b, 76d and 76f include merely the integral 90° extending platforms 86 coplanar with the platforms 84 upon which the buttons 32b, 32d and 32f are mounted. The sideways angularly-extending portions 82 permit relative clearance of the platforms 84 and 86 so that each bar of a given pair can be moved independently of the other. The structure is shown more clearly in FIG. 5.

At the lower ends of the bars 76, linkage is established with components of the shutter. For purposes of illustration, only, the three principal components of each shutter, namely, the rotatable disc-like shutter blade 88 including the aperture 90 and integral driving gear 92; the intermediate wheel 94 including the driving gear 96 and the flash actuator 98; and the shutter spring 100, are shown in FIG. 4 at locations identified with the individual bars 76b, 76d and 76f, merely to clearly indicate the component structures.

Let it be assumed, therefore, that, although a complete shutter is associated with each lens and diaphragm, the aforesaid shutter components 88, 94 and 100, shown at cocked positions, are to be regarded as components of a single shutter, overlapping one another, e.g., as those identified with and actuated by the bar 76f and the button 32, only. The components are, therefore, to be considered as positioned, along adjacent axes extending from front-to-rear of the camera, with the axis of the rotatable wheel 94 at point 102 and the axis of the rotatable plate 88 at point 104. The actual relative location of elements in the assembly is shown in FIG. 6. The spring 100 is of a so-called "safety-pin" type, that is, its arms 100a and 100b are normally sprung or biased outwardly. The spring-arm 100a is rotatably attached to a pin 106 extending rearwardly from the bar 76f. The spring-arm 100b is rotatably attached to a pin 108 extending forwardly from the rotatable wheel 94. The maximum rotational limits of the wheel 94 are determined by contact of the pin 108 with the extremities of a curved slot 110, formed in a fixed plate portion 112 of the camera front. As shown in FIG. 4, the spring-arm 100b has urged the wheel 94 in a counterclockwise direction to the extent permitted by contact of the pin 108 with the lower extremity of slot 110, thus providing the positions illustrated of wheel 94 and shutter blade 88. The spring includes a single loop 100c. A pair of electrical flash contacts 114 is so positioned as to be closed through contact of the actuator 98 therewith when the wheel 94 is rotated, it being understood that similar electrical contacts are associated with each of the six shutters.

When, for example, the button 32f is depressed, the bar 76f moves downwardly to the limit permitted by contact of the upper end of the slot 78 with the pin 80. The spring-arm 100a is thereby moved downwardly over center, carrying with it the spring loop 100c which is caused to undergo a generally clockwise arcual movement. The spring-arm 100b concurrently describes a somewhat similar clockwise movement, as shown in FIG. 7, its extremity, rotatably looped around the pin 108, being held against downward movement, however, by the aforesaid contact of the pin with the lower end of the slot 110. The maximum downward movement of the spring-arm 100a, to a location at which the pin 106 is at about the level of the electrical contacts 114, causes the spring-arm 100b to assume a tensioned conformation such that the spring-arm 100b now biases the pin 108 generally upwardly and the attached wheel 94 is urged to rotate in a clockwise direction. As shown in FIG. 8, the wheel 94 and unitary gear 96 are thus caused to rotate in a clockwise direction to the degree permitted by contact of the pin 108 with the upper limit of slot 110. Rotation of the wheel 94 and the gear 96 in the aforesaid clockwise direction drives the gear 92 and the integral shutter blade 88 in a counterclockwise direction and moves the shutter-blade aperture 90 across the diaphragm aperture 66 to perform the photographic exposure. Clockwise rotation of the wheel 94 also moves the flash actuator 98 into functional contact with the electrical flash contacts 114.

Figure 5:
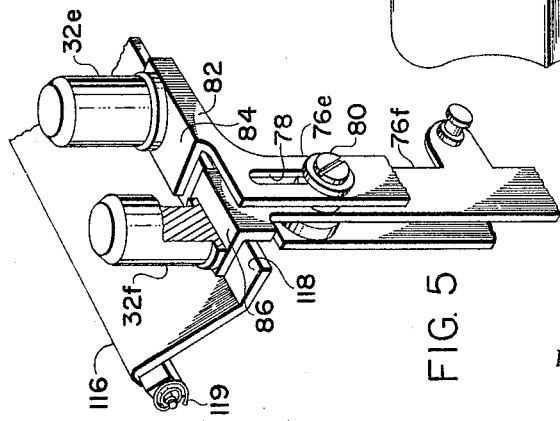
FIG. 5 is a fragementary perspective view of the shutter actuating bars and buttons.

Recocking or resetting of the shutter or shutters is performed by manually depressing the resetting lever 44. As shown in FIGS. 5 and 9, actuation of the lever 44 rotates the square shaft 116 and elevates the attached plate 118, the latter extending under the platforms 84 and 86 and carrying all of the platform upwardly. The lever is normally biased by torsion spring 119 so that the plate 118 normally rests on the upper edge of the plate 112. Accordingly, all of the depressed shutter bars 76 and actuating buttons 32 are returned to their cocked positions. Return of the bars 76 upwardly to the positions shown in FIG. 4 also provides a return of all components of the shutter mechanism to their cocked positions likewise shown in FIG. 4. This is brought about by the upward movement of each pin 106 to a location above that of pin 108 and by the resulting return of the spring 100 to its original tensioned condition. A so-called "defeat switch" 120 actuated by the plate 118 opens the flash circuit during the reverse rotation of wheel 94 so that closing of the flash contacts 114 by the actuator 98 during this reverse rotation does not energize the circuit. Capping means for covering the diaphragm apertures during return of the shutter blade 88 to cocked position is not shown and is not essential because of the film assembly structure in which the envelope thereof is returned to a position covering the photosensitive emulsion following the photographic exposure. Capping means may, however, be included and actuated by means associated with the bars 76. In general, it is advisable to cock the shutters prior to loading the film assembly in the film holder element to avoid an inadvertent exposure.

The structural features described herein provide a highly efficient and easily operated studio-type of camera adapted to provide photographic prints or proofs and negatives of high quality for immediate usage. The actuating buttons 32 may be depressed in any desired order and serve as an exposure indicator. A sequential order of depression of the buttons from left-to-right, or right-to-left, however, provides certain advantages in terms of the finished proofs. As viewed from the front, depression of the buttons 32, in order from left-to-right, or vice-versa, offers a simple method of procedure for the photographer which enables him to know in advance the exposure arrangement of the finished print. Passing the button in sequence from left-to-right provide a an exposure pattern of areas or frames of the 4 x 5 film associated with the lenses 20a, 20b, 20c, 20d, 20e and 20f, respectively. This permits a planned and orderly sequence of proofs or poses of the photographic subject by the photographer and, moreover, an arrangement of individual pictures within the overall 4 x 5 confines of the print which is most readily identifiable and acceptable to the client.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. An easily-operated, multiple-image portrait camera capable of producing, substantially simultaneously and immediately following the last of a plurality of photographic exposures, a complete set of proofs for presentation to the photographic subject and a complete set of negatives for use in making finished prints therefrom, said camera comprising finder means, a generally rectangular camera back including adapter means for holding a liquid-containing film assembly of a self-processing category which includes a single photosensitive area of a given format, and retaining means for slidably mounting said adapter means to effect its attachment and removal relative to said camera, a generally rectangular camera front substantially integral with said retaining means of said camera back and mounting in parallel planes therewithin a plurality of identical lenses, a like plurality of identical diaphragm and a similar plurality of identical shutter mechanisms, compartmentation means providing a like plurality of compartments associated with said lenses, diaphragms and shutter mechanisms for defining a similar plurality of exposable areas within said photosensitive area, each of said compartments having an open rear-end adjacent to a focal plane established by said lenses, a plurality of shutter-mechanism actuating buttons disposed in a line across the upper surface of said camera front for performing through superimposed slidably-mounted pairs of elongated bars connecting with said shutter mechanisms a sequence of photographic exposures, and shutter-mechanism resetting means for manually re-cocking all of said shutter mechanisms simultaneously, the adjacent buttons of each pair of said shutter-actuating buttons, when operated sequentially, actuating independently given superimposed pairs of said bars so as to provide operation of a vertically disposed pair of shutter mechanisms co-operating therewith, the independent actuation of said bars being permitted by a sideway displacement of alternate overturned extremities of said bars to which said buttons are attached.

2. A camera, as defined in claim 1, wherein said shutter-mechanism resetting means is a manually-operable lever, spring-biased to a given position.

3. A camera, as defined in claim 2, wherein said manually-operable lever is connected with means engaging said overturned extremities of said bars so as to lift said bars when said lever is depressed.

4. An easily-operated, multiple-image portrait camera capable of producing, substantially simultaneously and immediately following the last of a plurality of photographic exposures, a complete set of proofs for presentation to the photographic subject and a complete set of negatives for use in making finished prints therefrom, said camera comprising finder means, a generally rectangular camera back including adapter means for holding a liquid-containing film assembly of a self-processing category which includes a single photosensitive area of a given format, and retaining means for slidably mounting said adapter means to effect its attachment and removal relative to said camera, a generally rectangular camera front substantially integral with said retaining means of said camera back and mounting in parallel planes therewithin a plurality of identical lenses, a like plurality of identical diaphragms and a similar plurality of identical shutter mechanisms, compartmentation means providing a like plurality of compartments associated with said lenses, diaphragms and shutter mechanisms for defining a similar plurality of exposable areas within said photosensitive area, each of said compartments having an open rear-end adjacent to a focal plane established by said lenses, a plurality of linearly-disposed shutter-mechanism actuating buttons disposed in a line across the upper surface of said camera front for performing through superimposed slidably-mounted pairs of elongated bars connecting with said shutter mechanism a sequence of photograph exposures, and shutter-mechanism resetting means for manually re-cocking all of the said shutter mechanisms simultaneously, said compartmentation means including a plurality of compartment walls, extending from a forward location adjacent to said lenses, diaphragms and shutter mechanisms to a rearward plane adjacent to but slightly spaced from said focal plane, certain of said walls being so differentially spaced, horizontally, including those portions thereof located at said rearward plane, as to provide compartmentation thereat of given relatively different dimensions which permits central locations of the images of a photographic subject at the several areas of said focal plane aligned with said compartmentation, said compartmentation compensating for effects of parallax.

References Cited by the Examiner

UNITED STATES PATENTS

| | | | |
|---|---|---|---|
| 366,225 | 7/1887 | Kuhn | 95—18 |
| 525,439 | 9/1894 | Blackmore | 95—36 |
| 653,380 | 7/1900 | Davidson | 95—12.20 |
| 3,018,708 | 1/1962 | Rentschler | 95—18 |
| 3,128,685 | 4/1964 | Kitrosser | 95—18 |

JOHN M. HORAN, *Primary Examiner.*